Patented Dec. 26, 1933

1,940,773

UNITED STATES PATENT OFFICE 1,940,773

WHOLE GRAIN CORN AND METHOD OF CANNING THE SAME

Ogden S. Sells, San Francisco, Calif.

No Drawing. Application June 19, 1929
Serial No. 372,210

12 Claims. (Cl. 99—8)

This invention relates to improvements in the process of treating green corn for canning purposes and a new product of manufacture consisting of whole grain or kernel corn.

This invention relates more particularly to a process whereby whole grain canned corn may be economically produced under commercial canning factory conditions and to the product thereby produced consisting of whole, or substantially whole, kernels of corn in which substantially all of their milk, starch, sugar and germ contents are held in coagulated form in the kernel.

This application is a continuation in part of an application filed by me under date of October 13, 1927 and bearing Serial No. 226,045 for Process of canning corn, and a further application filed by me under date of November 5, 1927, Serial No. 231,398 for Process of treating corn for canning purposes, and a further application filed by me under date of May 17, 1928, Serial No. 278,639 for Process of canning corn.

The new process of treating and canning whole grain green corn disclosed therein comprises steps unknown before my discovery and adds very materially to the finished product and comes nearer to retaining the original corn flavor and tenderness than has heretofore been possible.

In order to fully appreciate my present invention and the importance of the discovery which I have made, as well as the attendant advantages to the public and the canning industry at large, it is believed desirable to give a brief description of the present manner of treating and handling green corn for canning purposes as well as to recite some of the difficulties encountered in the general run of commercial canning factories.

As ordinarily practiced, the ears of corn are received from the field in husks. They are then passed through a husking machine which ordinarily removes the husk and most of the adhering silk. The husked ears are then washed, trimmed and inspected, after which they are sent to the cutting rooms where the kernels are cut from the cobs, either by hand or machinery. The cut kernels are then passed through a machine which removes the remaining silk. From here the kernels are deposited on a moving belt for final inspection where pieces of cob, husk and imperfect and undesirable material is removed by hand.

After this final inspection, the mass of cut kernels is dumped into the hopper of a filling machine where they are filled into open top cans and a suitable brine, syrup or other solution added. The filled cans are then usually loosely covered and passed through an exhaust box for a preheating to drive out entrapped air and gases and to create sufficient heat in the contents to produce a suitable vacuum in the cans after final processing and cooling. From the exhauster the cans are passed through a sealing machine for final and permanent closing after which they are sterilized in a steam retort or cooker and cooled, thus completing the process.

The foregoing process has been substantially the standard method of canning corn for many years and has always contained some elements of dissatisfaction and concern to all canners. The product produced has practically no resemblance to green corn or the flavor of green corn. When the kernels are cut from the cob, either by hand or machine, much of the natural milk and juices of the kernel is lost. The germ of the kernel becomes separated from the remainder of the kernel. The milk content carries a great deal of the natural sugars of the kernel from the kernel. As soon as the skin of the kernel is punctured, the milk immediately runs out. As soon as the kernel is cut from the cob, unless the cut is run into the cob of the corn to close the end of the kernel, the yellow-colored germ of the kernel drops from the remainder of the kernel and becomes separated. The germ thus separated is a great deal smaller than the remainder of the kernel and a great portion of the germs are lost in this method of canning the corn. In corn that is in the most prime condition for canning, this loss seems greatest since the kernels are plump and full of milk and the least break in the skins releases the milk which immediately oozes out due to the hydrostatic pressure and carries with it a great portion of the natural sugar of the corn.

In passing the ears through the machine cutter, more or less pressure must be brought to bear on the kernel to drive the ear through the machine against the resistance of the cut, and consequently much of the milk is squeezed out and lost to the canner and the public robbed of the full nutriment in the corn. At the same time during the cutting process a great quantity of the yellow seed germs of the corn are lost. This yellow seed germ carries the greatest portion of natural nutriment of any part of the kernel of corn. It is in this yellow seed germ that the greatest portion of the oil and mineral constituents of the corn are found.

The loss of the natural constituents of the corn, consisting of the milk, sugar and seed germ of the kernel, is most manifest where the double cut is practiced. This double cut consists in first cutting the tops of the kernels off and then making a second cut to remove the balance of the kernel, thus cutting the kernel into two and fully exposing the contents. This manner of cutting makes large kernel corn look like small kernel corn and brings a somewhat higher price. Sometimes the kernels are slit vertically during the cutting operation, which also permits great loss of natural milk.

The natural sugars of the kernel of corn are apparently carried by the corn in three distinct places. The cob carries a certain quantity of the natural sugars; a certain quantity of the natural sugars is apparently loosely held by, or immediately around, the seed germ of the kernel; a third pocket of loosely held natural sugar is apparently found at the very top of each kernel. The existence of this last pocket of natural sugar is evidenced by the method practiced in picking corn for the purpose of canning of biting into the tip of the kernel of corn to ascertain when it is in prime condition for canning. When following the old method as herein outlined of canning corn, the greatest portion of these natural sugars are lost. There is no opportunity for getting into the canned product any of the cob sugars. The separation of the seed germ from the remainder of the kernel results in a loss of a great portion of the natural sugars carried by or immediately surrounding the said germ. The slitting of the skin of the kernel so that the milk oozes from the kernel results in the dissipation with the milk of practically the entire pocket of sugar carried at the end of the kernel.

Another feature of great concern connected with the canning of green corn resides in the great difficulty of maintaining a sufficient vacuum in the sealed cans after the product has been stored.

Before the filled cans are finally sealed the corn is heated in an exhaust box as noted to drive out from the mass of corn or brine any occluded gas or air. The cans are then quickly sealed before the contents become materially cooled so that when fully cooled after sterilization and the mass shrinks thereby, there will be a head space in each can and a substantial vacuum created which will draw the ends of the can inward into a concave form which the trade and consuming public has been taught represents a perfect canned food.

In the ordinary process of treating and canning corn, very much of the occluded air and gas is removed, but just enough of this occluded gas and air remains to very materially reduce the original vacuum after the cans have stood in storage only a short time. Many times this occluded gas or air is sufficient to completely destroy the original vacuum and make it appear as a spoiled can when in fact the contents may be perfectly good. This residual air or gas is mostly contained within the cell structures of the kernels and gradually seeps out of the kernels as they stand and, finding its way to the head space of the can, completely or partially destroys the vacuum.

My discoveries include several additional and highly important steps to the process of canning corn and to the product of manufacture consisting of whole cut or substantially whole cut kernels of corn in which the natural constituents of the kernels are fixed in a manner to render the kernel palatable and of a taste which resembles very closely that of fresh green corn.

In accordance with the preferred method employing my invention, substantially the following procedure is carried out:

Before the kernels are cut from the cob, the ears are given a heat treatment for a period of time sufficient to fix the kernel contents. The heat of the ears with the kernels thereon is controlled so that the heat treatment is carried out just sufficiently to fix the contents of the kernel to where the said contents will congeal when followed by cooling. The heat treatment is controlled both in temperature and then to fix the constituents of the kernel to where they will congeal on cooling. I have found that the temperature must be controlled, as too high a temperature will toughen and darken the kernels, and that there is, when using too high a temperature, a danger of forming a solid core within the kernel of corn which is tough. When using a higher temperature, however, the heat treatment requires a shorter time, but the time interval is more difficult to control.

When a lower temperature is employed, there is less danger of toughening and darkening the kernel, and a low temperature has only a slight coloring effect and will not affect the skin. When using a low temperature there is no relative danger of forming the core for the reason that the fixing of the constituents of the kernel is not accomplished so suddenly. A lower temperature requires a longer period of time, which increases the volume of the treaters required for handling a given quantity of corn, and consequently the expense of carrying out the process. A lower temperature has been found also produces a greater tendency to even the maturity of the corn being treated by bringing all of the kernels to substantially the same physical conditions.

Following the heat treatment the ears of corn are passed through a cooling step which has the effect of setting the already fixed constituents of the kernel of corn coagulating the milk and starch contents of the kernel and fixing or congealing the entire kernel mass so that the occluded gas or air and the original flavor in the cell structure is sealed against escape in subsequent operations to complete the canning process and during the period of storage until the cans are finally opened by the consuming public.

This process also seals in the kernels of the corn the yellow seed germ of the kernels so that it is not lost when the kernels are cut from the corn. The entire contents of the kernel are by this method fixed so that substantially the natural flavor of the kernel is found in the corn after it has been canned.

This treatment permits the cutting of whole kernels or substantially whole kernels from the cob by machinery without any loss of the constituent parts of the kernels or the flavor of the kernels and enables the canner to acquire and maintain a much higher vacuum in his product, lengthening very materially the time in which he can dispose of his product with the feeling that his cans will show and maintain sufficient vacuum to satisfy the trade and the consuming public.

By either the old or new process of treating and canning corn the finished cans just after packing will show a vacuum ranging from 12 to 17 inches. In the old process where the kernels have not been heat treated and pre-cooled before cutting from the cob, the vacuum in the cans will be practically gone at the end of six months. When following the process embodying my invention, including the controlled heating and controlled cooling before cutting the kernels from the cob, the vacuum after six months will run from 3 to 15 inches, indicating conclusively that my improved method actually seals the occluded air or gas present in the kernels during the treatment.

Some air and gas will be entrapped with the mass of corn or syrup in each can that the exhaust step will not remove. This will gradually leak out of the mass and escape into the head space in the sealed cans during their period in the storage before being consumed and will reduce the original vacuum to some extent. By sealing the air and gas in the kernel structure by my controlled heat treatment and controlled cooling steps, there is not enough air left in the mass to completely destroy the original vacuum.

The yearly output of canned whole grain corn has been necessarily restricted due to the ineffective methods heretofore available for producing it. Before my improved methods, all whole grain corn was cut from the cob by hand, which is necessarily slow and more or less variable, according to the skill of individual cutters. All hand-cutting has been with a straight knife operating lengthwise on a round ear of corn with the result that some of the kernels are cut whole, some are sliced in two with each stroke of the knife, thus making a mixed product of whole and sliced kernels.

My improved method of controlled heat treatment and controlled cooling before cutting the kernels from the cob so conditions the kernel contents that machine cutting becomes possible and practical for large scale cannery operations. Machine knives are circular and automatically follow the contour of the cobs in each instance so that substantially all of the kernels are cut whole. The machine cut product is therefore much superior in quality and demands a much higher price than any other grades or kinds of corn packed. This fact becomes better appreciated when it is understood that canned corn is judged very largely by its appearance when the can is opened and this is especially so in the hands of the trade. Their judgment is based almost entirely on appearance in grading the corn. The whole grains of corn and the liquor free from chaff and residue that is possible only with my improved method receives the highest grading from the consuming public.

My improved method makes possible the new step of the process that has not heretofore been possible or practicable. This step consists of washing the kernels after cutting and before putting them into the cans which enables easy removal of the chaff by flotation producing a much better looking, as well as a more sanitary product. The product produced, which is free from chaff, pieces of cob, corn silk and the like, is also much more palatable.

The pre-heat treatment of the corn on the cob gives a slight tendency for the chaff at the base of the kernels to come off with the kernels when they are cut close to the cob. This chaff also comes off more or less in the ordinary process where the corn is not pre-heated. When carrying out the ordinary process of canning corn, the free-flowing milk prevents the removal of this chaff from the corn necessitating putting the chaff into the cans with the corn resulting in clouding of the liquor and giving a somewhat unpalatable appearance to the corn, and the chaff itself is not particularly palatable. With my improved process, however, the removal of the chaff is very easily accomplished in this new washing step where for standard corn I prefer to wash in water while for fancy grades I prefer to use milk. The chaff being lighter than the kernels floats on the surface of the liquid and is easily removed so that the final product going into the can is very much cleaner and much better than has heretofore been produced.

I have also discovered that my pre-heating and cooling steps before cutting from the cob permits me to place cold corn in a can and then fill with boiling hot brine and immediately seal the can before it cools perceptibly. This modified method of canning may be resorted to rather than the customary exhaust-step.

In accordance with the preferred embodiment of my invention, I prefer to follow the following process maintaining the treatment steps within the following specified limits in order to produce the best results. The ears of corn with the husks removed are placed into either water, milk or other suitable liquid, the temperature of which is controlled by the condition of ripeness and other conditions of the corn. I have found in practice that a temperature of approximately 165° F. to 180° F. gives the best results in carrying out my process. For corn which is of an ideal condition of ripeness I have found that the temperature of the liquid should be approximately 170° F. and that the time of subjecting the ears of corn with kernels thereon to the treatment in this liquid at 170° F. should be approximately 4 minutes. As the temperature of the liquid is increased, the time of treatment should be reduced. When following through the process with corn of an ideal condition of ripeness, I have found the ears of corn should be passed through a cooling step consisting of a bath of water at ordinary room temperature for approximately 2 minutes. In case where the corn is continuously passed through a water bath consisting of a tank, the tank should be supplied with a continuous fresh supply of water with approximately a one inch stream of water. This cooling treatment is just sufficient to properly coagulate the contents of the kernels which have previously been fixed by the heat treatment.

As heretofore set forth, the time and temperature may of course be adjusted to suit any prevailing conditions and may vary somewhat from these figures, the temperature to be used and the times of treatment depending upon the desired conditions of operation to a great degree except that I have found that in order to produce a proper product that this preliminary heat treating step with the kernels on the cob should not be carried to the extent of where the corn has a cooked taste. The corn leaving this first step should have a raw taste but should be sufficiently treated to coagulate the contents of the kernels to where they will be fixed on the cooling step. Over-cooking the kernel mass produces what might aptly be termed a hard-boiled egg condition of the kernel contents having the effect of making the kernel tough and rubbery and somewhat tasteless.

I have mentioned a pre-heating bath of water, milk or other suitable liquid. Pre-heating may also be accomplished by other means as by subjecting the husked ears to a heated chamber, to a heated spray of air or liquid, or the unhusked ears to jets of steam, or may constitute parboiling the ears in either water or milk as stated, or the ears might well be heat-treated by properly applying electrical heat treating apparatus.

By my method of preparing corn for canning I have found that the product produced has a taste which very closely approximates the taste of freshly cooked green corn in that all of the contents of each kernel are held in their correct position in the kernel, the natural sugars, starches, oils and minerals of the corn kernel are all held intact, and besides the kernels of the corn have a slight taste of the cob, occasioned by my method of treatment, similar to the cob flavor taste obtained when actually biting the kernels from an ear of freshly cooked corn. My process apparently results in the flavoring of the kernels of corn by the controlled heat treatment and cooling steps of drawing into the kernels some of the sugars of the cob as well as the essential flavors of the cob.

It is therefore the principal object of my invention to provide a method of canning whole grain corn which is adaptable to ordinary canning practice wherein there is employed a controlled heating and cooling treatment of the kernel on the cob of the corn to coagulate and fix the kernel contents so that the kernels, when the same are cut from the cob, will not lose their natural milk, starches, sugars and the like.

It is an object of my invention to produce an article of manufacture consisting of whole cut kernels of corn which retain substantially all of their natural milk and starch content in coagulated form.

It is also an object of my invention to produce an article of manufacture consisting of whole cut kernels of corn which retain substantially all of the kernel contents in coagulated form to hold the kernel seed germ fixed within the kernels.

It is also an object of my invention to produce an object in the treating of corn for canning purposes to remove chaff and other undesirable matter and thereby produce a cleaner and higher quality product.

Other objects and advantages of my invention it is believed will be apparent from the preceding detailed description of the preferred embodiment of my invention, and it is to be understood that I have herein set forth what I considered the preferred method of carrying out my invention and I do not wish it understood that my invention is limited to the preferred embodiment herein set forth, but my invention is for the full scope of the appended claims. Throughout the specification and claims applicant has repeatedly mentioned the change taking place in the kernel contents as being a "coagulation", "fixing", "setting", "thickening", etc., all of which are only used relatively, and are intended to convey the fact that the heating and cooling steps of applicant's process produce some change in the kernel contents that prevents the kernels from bleeding, or the contents escaping, appreciably, during or after the cutting step.

I claim:

1. The method of treating green corn for canning purposes comprising the steps of heating the ears for a time of approximately 4 minutes at a temperature of approximately 165 degrees to 180 degrees F., then cooling the ears for approximately 2 minutes in water at normal temperature to set and fix the changes effected in the kernel structure by the heating step so the kernels may be cut from the cobs without loss of kernel contents.

2. The method of treating green corn for canning purposes comprising the steps of heating the ears of corn for a time of approximately 4 minutes at an approximate temperature of 165 degrees to 180 degrees F., then cooling to set and fix the kernel structure, then cutting the kernels from the cob, filling into cans, exhausting, sealing and sterilizing.

3. The method of canning whole grain corn comprising the steps of heating the ears for approximately 4 minutes at approximately 165 degrees to 180 degrees F., then cooling the ears to set and fix the changes effected by the heating step, cutting the corn from the cob and completing the canning process.

4. The method of treating green corn for canning purposes including the steps of heating the ears of corn with the kernels thereon at a temperature of approximately 165 degrees to 180 degrees F. for a period of time insufficient to actually cook the kernels of corn, cooling the kernels of the corn to coagulate the kernel contents, and cutting the kernels of corn from the cob.

5. The method of canning whole grain green corn comprising the steps of heating the ears for a controlled time and temperature short of cooking but sufficient to coagulate the kernel contents, then cooling the ears sufficiently to fix the entire coagulated contents of the kernels, then cutting the kernels substantially whole from the cobs, filling into containers, exhausting the containers, sealing permanent covers on the containers and sterilizing the closed containers.

6. The method of canning whole grain corn comprising the steps of heating the green corn for a time and temperature to coagulate the kernel contents but short of cooking, then cooling the ears sufficiently to fix the entire coagulated contents of the kernels so there will be no appreciable flow of kernel contents when cut from the cob, then machine cutting the kernels substantially whole from the cob and completing the canning process.

7. The method of canning green corn comprising the steps of heating ears of corn under a controlled time and temperature to thicken the kernel contents without cooking the kernels, then cooling the ears under a controlled time and temperature to fix the whole of the heated kernel contents so there will be no appreciable flow of kernel contents when cut from the cob, then cutting the kernels from the cob, washing the cut kernels to remove undesirable matter therefrom, filling into containers and completing the canning process.

8. The method of treating green corn for canning purposes comprising the steps of controlled heating of the ears of corn short of cooking but sufficient to thicken the kernel contents, cooling the heated ears sufficiently to fix the thickened contents to entrap the occluded air and gas in the whole of the cell structure, cutting the substantially whole kernels from the cobs and then completing the canning process.

9. The method of canning whole grain corn including the steps of heating the ears of green corn short of changing the raw taste but sufficient to set the kernel contents, then cooling the hot ears sufficiently to fix the whole of the kernel contents, then cutting the kernels whole from the cobs, filling into containers and finishing the canning process.

10. A method of canning whole grain green corn comprising the steps of heating the green ears of corn to set the entire kernel contents including the germ but insufficient to give the kernels a cooked taste, then immediately cooling the hot ears to fix the whole of the kernel contents including the germ so there will be no appreciable flow of contents from the kernels when cut, then cutting the whole kernels from the cobs including the germ and completing the canning process.

11. A method of preparing whole cut kernels of corn for canning, which consists in subjecting the cob of the corn with the kernels thereon to a heat treatment short of cooking, but sufficient to so change the character of the fluid contents of the kernels so that the said entire fluid contents will coagulate upon being cooled, then cooling the cob of the corn with the kernels thereon sufficiently to coagulate the fluid contents, then cutting the kernels substantially whole from the cob and completing the canning process.

12. The process of canning green corn comprising the steps of heating the ears of corn sufficient to so change the character of the kernel contents so that the entire contents will coagulate when cooled, then cooling the ears to coagulate the kernel contents, then cutting the kernels from the cob, placing the cut kernels into containers, covering them with a boiling hot brine and sealing the containers before the contents cool perceptibly and then completing the canning process.

OGDEN S. SELLS.